United States Patent [19]

Lough

[11] 4,168,429
[45] Sep. 18, 1979

[54] INFRARED BORESCOPE DEVICE AND METHOD OF BORESIGHT ALIGNMENT OF A WEAPON

[75] Inventor: Lewis E. Lough, Springfield, Va.

[73] Assignee: The United States of America as represented by the Secretary of the Army, Washington, D.C.

[21] Appl. No.: 861,140

[22] Filed: Dec. 16, 1977

[51] Int. Cl.² .................. H01J 31/50; G01J 1/00; F21K 2/00
[52] U.S. Cl. .................. 250/330; 250/347; 250/467
[58] Field of Search .............. 250/334, 342, 333, 483, 250/330, 347, 467; 356/51, 138, 152, 154; 362/110; 33/234

[56] References Cited

U.S. PATENT DOCUMENTS

| 3,465,150 | 9/1969 | Hugle | 250/393 |
| 3,607,772 | 9/1971 | Kozak | 250/483 |
| 3,787,693 | 1/1974 | Stone | 250/330 |
| 4,038,547 | 7/1977 | Hoesterey | 250/203 R |
| 4,087,689 | 5/1978 | Asawa | 250/347 |

FOREIGN PATENT DOCUMENTS 587605 11/1959 Canada ............. 33/234

*Primary Examiner*—Alfred E. Smith
*Assistant Examiner*—Carolyn E. Fields
*Attorney, Agent, or Firm*—Nathan Edelberg; Milton W. Lee; Max L. Harwell

[57] ABSTRACT

An infrared (IR) borescope device and a method of its use in the boresight alignment of small caliber weapons. The borescope device has a tapered or expandable mandrel for fitting into the muzzle end of a weapon and a housing containing an IR phosphor covered reticle on one side of a light transparent substrate for converting an IR aiming light beam from an IR aiming light mounted on the weapon into a visible spot of light. The housing also contains a collimating optic means for collecting the IR aiming light beam. The IR aiming light beam is aligned on the IR phosphor covered reticle by adjustment of the azimuth and elevation adjustments on the IR aiming light.

7 Claims, 2 Drawing Figures

INFRARED BORESCOPE DEVICE AND METHOD OF BORESIGHT ALIGNMENT OF A WEAPON

The invention described herein may be manufactured, used, and licensed by the U.S. Government for governmental purposes without the payment of any royalties thereon.

BACKGROUND OF THE INVENTION

Previously known methods of boresight alignment of small caliber weapons that utilized night viewing equipment used a second light, or boresight light, in the gun barrel of the weapon along with the aiming light mounted on the weapon for boresight alignment of the weapon. Alignment by the use of both lights required that a target at some distance away be used to zero in both light beams, i.e. beams from the boresight light and the aiming light, at a spot on the target. The operator that is aligning the weapon uses a night viewing device for observing the relative positions of the boresight light beam and the IR aiming light beam while the IR aiming light beam is zeroed in azimuth and elevation.

SUMMARY OF THE INVENTION

The present invention eliminates the need for a boresight light or a target as in the previous methods of boresight alignment, and thus decreases the possibility of an enemy detecting the IR light since the entire IR aiming light beam is collected by the present IR borescope device, and therefore remains in the immediate vicinity between the IR aiming light and the IR borescope device.

Two embodiments of the IR borescope device are presented herein. Both embodiments are comprised of a mandrel, which may be either tapered or expandable, connected to a borescope housing by way of stand-off bracket. The borescope housing is comprised of collimating optic means and IR-to-visible converting means. The IR-to-visible converting means is specifically comprised of a substrate having an IR sensitive phosphor coating on one side thereof upon which a reticle pattern is displayed. The IR phosphor coating emits a visible wavelength of the IR aiming light beam striking the IR phosphor. An alignment optic means is positioned to receive the IR aiming light beam from the IR aiming light and focus the beam on the IR phosphor coating. The collimating optic means may comprise a collimator lens in straight line with the IR phosphor coated substrate and a magnifier lens contained in a magnifier lens housing through which an observer views the visible wavelength emitted from the IR phosphor coating. Alternatively, the end of the borescope housing may be enclosed by an adjustable end plate wherein the IR phosphor coating of the substrate is contiguous with the end plate for reflecting back a visible spectrum. Also, a beam splitter receives the IR aiming light beam and passes that beam through a collimator lens to the IR phosphor coated substrate but reflects the visible wavelength out to a viewing window at the side through which an observer is viewing.

DETAILED DESCRIPTION OF THE PREFERRED EMBODIMENTS

Figure 1:
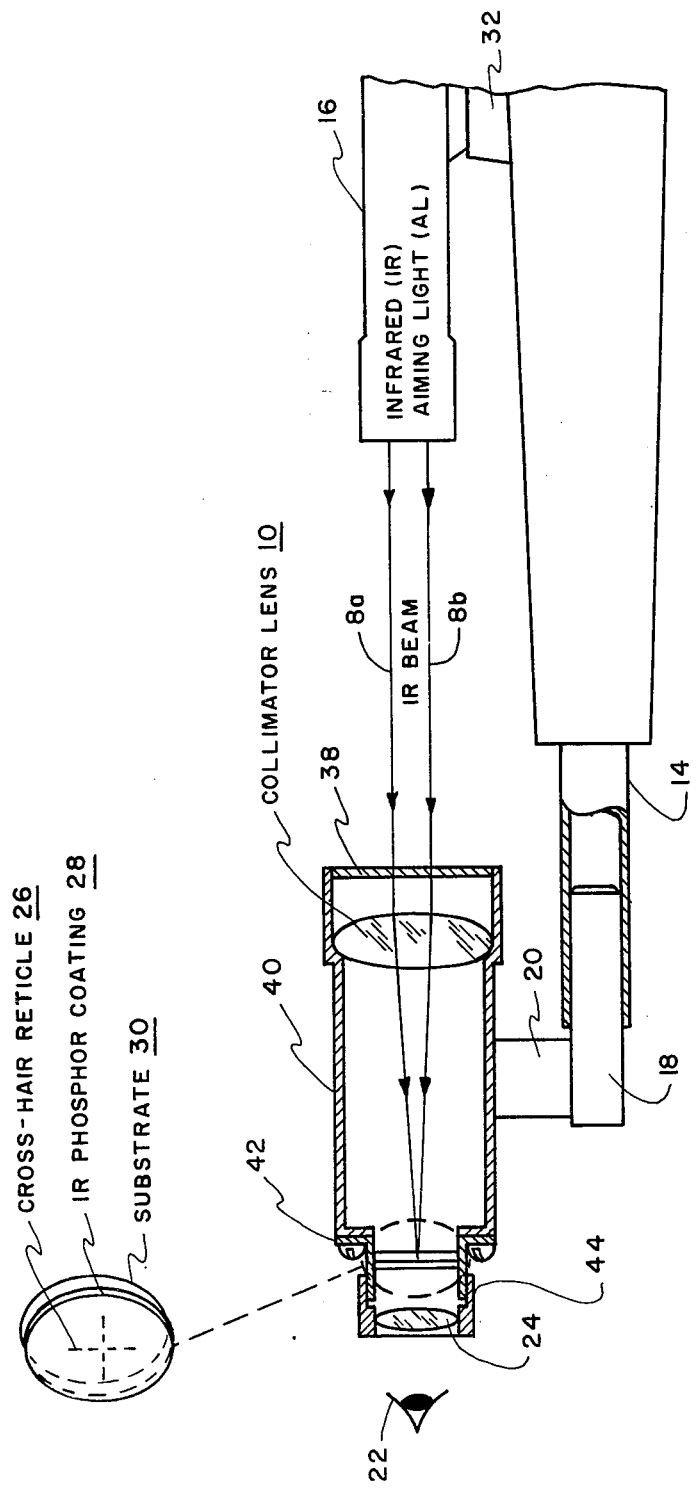
FIG. 1 illustrates a sectional view of one embodiment of an IR borescope device attached by mandrel to the muzzle end of a weapon.

Look now at FIG. 1 for an explanation of one embodiment of the IR borescope device used in a method of aligning the borescope of a small caliber weapon, with only the muzzle end of the weapon gun barrel 14 shown. The weapon has an infrared (IR) aiming light 16 attached thereto by an aiming light mounting bracket 32. The IR aiming light 16 is typically used with, but not limited to, U.S. Army small caliber weapons, such as the M16, M60, M67, and M72. The present IR borescope device may be used by an observer with the IR aiming light in which the observer may determine the boresight alignment of the IR aiming light 16 without the use of a target or even the use of night viewing aids since the IR borescope device converts from IR to visible. The soldier that uses the IR borescope device on a weapon may check the accuracy of the IR aiming light in boresight alignment in either daytime or nighttime, including actual battle conditions. For previous boresight alignment methods the weapon needed to be fired, or alternatively an IR boresight light inserted in the muzzle end of the weapon whereby the IR aiming light beam was adjusted in azimuth and elevation to fall on the same spot or bull's eye as the boresight light beam. The bull's eye might be about 25 meters distance away from the observer. Other aiming lights that the present IR borescope device may be used for boresight alignment are taught in U.S. Pat. No. 3,787,693 by inventor Robert L. Stone and 3,867,764 by Howard L. Dunmire and Michael Hacskaylo, in which these patents are commonly assigned to the assignee of this application, i.e. The United States of America as represented by the Secretary of the Army.

In the present method of boresight alignment, an observer may wear night viewing goggles to align the weapon at nighttime even though the light is converted from IR to visible since the visible light spectrum can be seen through the night viewing goggles. Also, an IR-to-visible converting means within the IR borescope device housing 40 converts the IR aiming light beam into a visible spot for direct viewing by the observer at nighttime or daytime indicated by eye 22. Also, in housing 40 is an alignment optic means for alignment of the IR aiming light beam, indicated by edges 8a and 8b, onto the IR-to-visible converting means. The IR borescope device is comprised of a tapered or expandable mandrel 18 that is the proper size to fit snugly into the muzzle end of a gun barrel 14 and be rotatable so that the IR borescope housing 40 is secured on the weapon in optical alignment with the IR aiming light 16. Mandrel 18 is attached to housing 40 by an offset bracket 20. The offset bracket may be a variable height section that is attached to compatible mandrel according to the caliber of the weapon whose boresight is being checked. Since the IR aiming light 16 is generally on top of the weapon the housing 40 is also rotatably positioned on top of the weapon.

In operation, a mandrel 18 that is of the proper size for the caliber of the muzzle end of the gun barrel 14 is inserted in the muzzle end and is rotated so that the housing 40 is in optical alignment with the IR aiming light beam 8a and 8b. The IR aiming light beam is received through light transparent entrance window 38.

A collimating optic means, which may be comprised of collimator lens 10 that further may be a double convex refractive lens which is coated for transmission on the same wavelength as that of the IR aiming light beam, focuses the IR aiming light beam into a spot on an IR-to-visible converting means. The IR-to-visible converting means may be comprised of a light transparent substrate 30 having an IR phosphor coating 28 with a reticle pattern 26 thereon wherein the IR phosphor coating 28 converts the IR aiming light beam spot into a visible spot. The IR-to-visible converting means is enclosed inside an adjustable end plate 42. The reticle pattern may be a cross-hair or other suitable alignment marking pattern. An observer, indicated by numeral 22 may view the visible spot through a magnifier lens 24 within a magnifier lens housing 44 attached to the end of housing 40. The visible spot is centered on the reticle pattern by adjustment of the azimuth and elevation of the IR aiming light beam 8a and 8b from light 16. The light transparent substrate 30 may be clear glass, or clear plastic, or equivalent light transparent material. The magnifier lens housing 44 is attached to the adjustable end plate 42 so that the magnifier lens 24 and substrate 30 are simultaneously moveable for alignment with the IR beam and then may be tightened down by screws.

Figure 2:
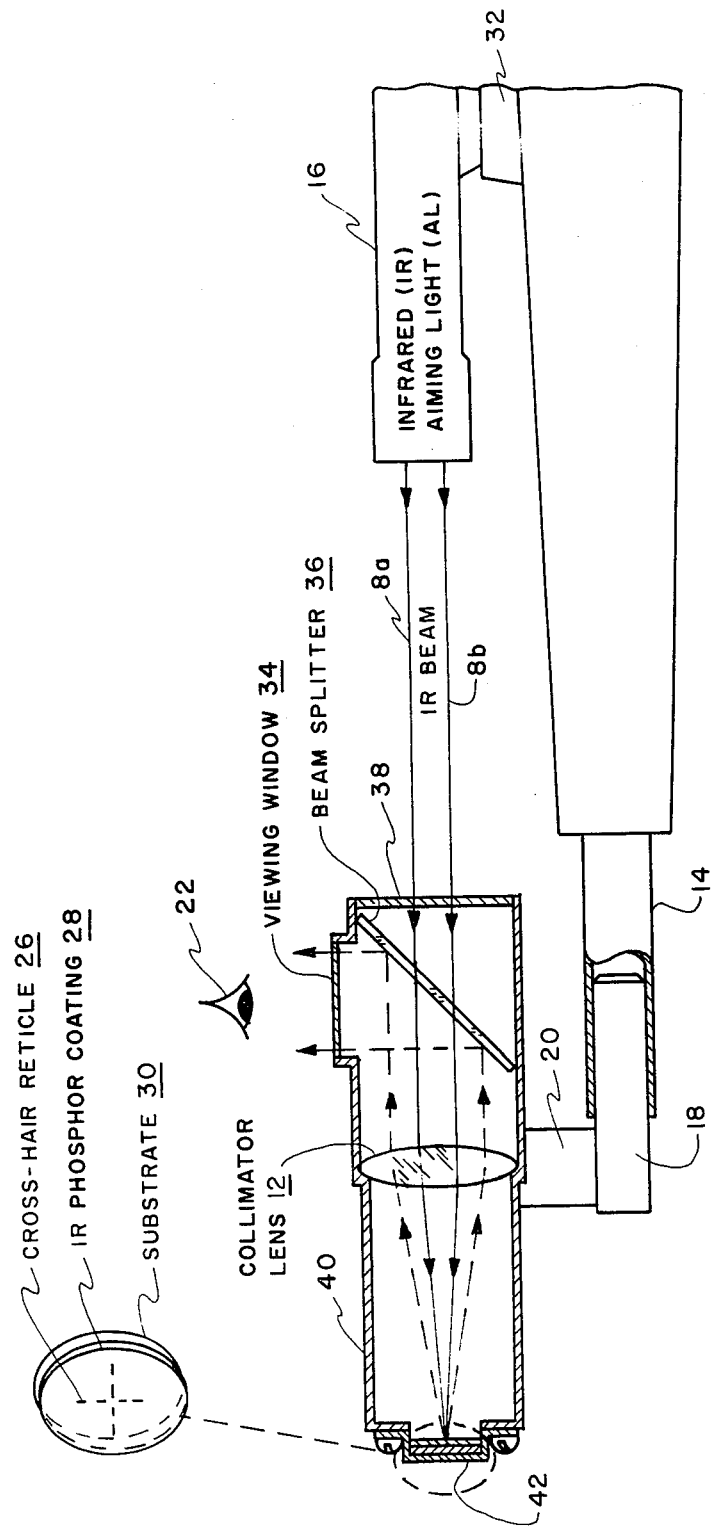
FIG. 2 illustrates a sectional view of a second embodiment of a IR borescope device of the present invention.

FIG. 2 illustrates a second embodiment of the present IR borescope device wherein an observer views the visible spot through a viewing window 34 on the top of housing 40. An adjustable end plate 42 is secured to the end of housing 40 that is opposite the entrance window 38 where the IR aiming light beam 8a and 8b enters. The IR phosphor coating 28 and reticle pattern 26 are contiguous with end plate 42. Therefore the IR aiming light beam enters substrate 30 as an infrared light spot and exits as a visible light spot. The alignment optic means of FIG. 2 is comprised of a beam splitter 36, which receives the IR aiming light beam on a backside thereof and passes the IR aiming light beam therethrough, and a collimator lens 12. The collimator lens 12 focuses the IR aiming light beam on the IR phosphor coating 28 and reticle pattern 26 and also collimates the return visible light spot onto the front side of the beam splitter 36. The visible light spot is reflected off the front side of beam splitter 36 and out a side viewing window 34 for viewing by an observer. Side viewing window 34 is juxtaposed at a 45° angle to the front side of the beam splitter 36.

Means for daytime boresight alignment of the IR aiming light may comprise the following methods. One method would be to use the naked eye and to view the visible spot through the viewing window. The spot is then centered on the reticle pattern by adjustment of the azimuth and elevation adjustments of the IR aiming light. Another method would be to use a night viewing device, such as the night vision goggles, to view the visible spot in daytime. The objective lens of the night viewing device may also use a lens cap with a pinhole aperture, or a lens cap with an optical filter, in order to reduce the incoming light during daytime viewing. The spot is then centered by the same method as previously described. Nighttime alignment may be the same as described above for the daytime alignment without the use of pinhole or filters.

I claim:

1. A method of aligning the boresight of an IR aiming light mounted on a weapon wherein said IR aiming light emits an IR light beam along the bore of said weapon, comprising the steps of:

mounting on the muzzle end of said weapon an IR borescope device for viewing the boresight alignment of said IR light beam as transposed on an IR-to-visible converting means comprised of an IR phosphor covered reticle pattern on one surface of a transparent substrate;

rotating said IR borescope device around the muzzle end of said weapon such that the entirety of said IR light beam is contained between said IR aiming light and said IR borescope device for collecting said IR light beam within said IR borescope device for optical alignment with the viewing area of said IR phosphor covered reticle pattern;

collimating and projecting said IR light beam onto said IR phosphor covered reticle pattern;

converting the collimated IR light beam into a visible beam of light;

directly viewing said visible beam of light at an output of said IR borescope device; and adjusting the azimuth and elevation of said IR aiming light until said visible beam of light that transposes on said alignment marking pattern corresponds to a desired boresight alignment.

2. An IR borescope device for use in boresighting an IR aiming light beam emitted along the bore of a weapon from an IR aiming light mounted on said weapon, said IR borescope device comprising:

a borescope housing having collimating optic means and an IR-to-visible converting means comprised of an IR phosphor covered reticle pattern mounted on one side of a transparent substrate; and a mandrel connected to said borescope housing by an offset bracket wherein said mandrel is of the size to fit snugly but be rotatable within the muzzle end of said weapon when inserted therein for positioning said borescope housing with respect to said IR aiming light beam so that said collimating optic means is aligned with said IR aiming light beam entering said borescope housing through a light transparent entrance window for collecting the entirety of said IR aiming light beam within said borescope housing and wherein said collimating optic means focuses said IR aiming light beam on said IR phosphor covered reticle pattern as a spot of IR light that is converted from IR to visible by said IR phosphor covered reticle pattern and is emanated therefrom as a visible light spot for directly viewing by an observer for zeroing said IR aiming light beam on the center of said reticle pattern of said IR phosphor covered reticle pattern.

3. An IR borescope device as set forth in claim 2 wherein said reticle pattern is a cross-hair reticle.

4. An IR borescope device as set forth in claim 3 wherein said transparent substrate is clear glass.

5. An IR borescope device as set forth in claim 3 wherein said transparent substrate is clear plastic.

6. An IR borescope device as set forth in claim 2 wherein said collimating optic means is comprised of a double convex refractive collimator lens in alignment with said IR aiming light beam for focusing said IR aiming light beam into a spot of light on said IR phosphor covered reticle pattern and said output of said IR borescope device is a magnifier lens through which said visible light spot is directly viewed by an observer whereby said observer zeroes said IR aiming light in azimuth and elevation to project said IR aiming light beam on said IR phosphor covered reticle pattern corresponding to the desired boresight alignment.

7. An IR borescope device as set forth in claim 2 wherein said collimating optic means is comprised of a beam splitter positioned inside said light transparent entrance window at about a 45° angle to said IR aiming light beam for transmitting said IR aiming light beam therethrough and a double convex refractive collimator lens for focusing and transmitting said IR light beam through said transparent substrate into a spot of light on said IR phosphor covered reticle pattern wherein the IR phosphor covered reticle pattern is contiguous with an end plate for reflecting back said spot of light as a visible light spot through said double convex refractive collimator lens in which said visible light spot is reflecting off said beam splitter and out a viewing window for directly viewing by said observer while zeroing said IR aiming light beam on said IR phosphor covered reticle pattern.

* * * * *